United States Patent [19]

Green et al.

[11] Patent Number: 5,049,868
[45] Date of Patent: Sep. 17, 1991

[54] ELECTROCHROMIC DISPLAY DOT DRIVE MATRIX

[75] Inventors: Paul E. Green, La Mirada; Margie M. Nicholson, San Marino, both of Calif.

[73] Assignee: Rockwell International Corporation, El Segundo, Calif.

[21] Appl. No.: 409,540

[22] Filed: Sep. 19, 1989

[51] Int. Cl.$^5$ .......................... G02F 1/15; G09G 3/38
[52] U.S. Cl. .................................... 340/785; 340/783; 359/267
[58] Field of Search ........... 340/782, 784, 785, 825.81, 340/825.82, 781, 773, 775, 783; 350/357

[56] References Cited

U.S. PATENT DOCUMENTS

| | | | |
|---|---|---|---|
| 4,228,431 | 10/1980 | Barclay et al. | 340/785 |
| 4,364,041 | 12/1982 | Fukuda et al. | 340/785 |
| 4,456,337 | 6/1984 | Nicholson. | |
| 4,469,449 | 9/1984 | Kato. | |
| 4,488,780 | 12/1984 | Nicholson. | |
| 4,512,637 | 4/1985 | Ballmer. | |
| 4,516,120 | 5/1985 | Sakuyama. | |
| 4,649,382 | 3/1987 | Martin et al. | |

FOREIGN PATENT DOCUMENTS 52-7752  1/1977  Japan.
60-169837  9/1985  Japan.
61-4030  1/1986  Japan.

OTHER PUBLICATIONS

Multicolor Electrochromic Dot–Matrix Display Investigation Report ONR-CR339-005-IF, Jun. 1980; Nicholson et al.

Primary Examiner—Alvin E. Oberley
Assistant Examiner—Steve Saras
Attorney, Agent, or Firm—Tom Streeter; John J. Deinken

[57] ABSTRACT

A planar matrix of display picture elements is operated by supplying power to the picture elements by a high current planar drive electrode connected to the picture elements, and a planar counter electrode slightly separated from the picture elements' display dots, and by addressing the picture elements with low current leads parallel to the plane of the matrix. The planes of the electrodes are parallel to the plane of the matrix. The elimination of high current power leads improves response time and resolution. The separation of the counter electrode from the display dots eliminates the need to refresh the picture elements. An isolation transistor in series with the drive transistor allows simultaneous color change of the entire matrix by simultaneous turning on and off of all isolation transistors.

10 Claims, 3 Drawing Sheets

ELECTROCHROMIC DISPLAY DOT DRIVE MATRIX

This invention was made with Government support under Contract No. N00014-85-C-0415 awarded by the Navy. The Government has certain rights in this invention.

TECHNICAL FIELD

This invention relates to electrochromic display dot drive matrices, and has particular relation to matrices which may rapidly change the entire display, yet which retain the configuration of the display without continually refreshing it.

BACKGROUND ART

A display screen may comprise a large number of display dots. Each dot is driven by a small electric current or voltage. It changes or retains its color in response to the voltage or current impressed on it.

In a multicolor electrochromic display (including black/white and monochrome/colorless), dots displaying different colors are generally at different voltages, and will discharge to a common voltage (and, thus, to a common color) unless they are isolated from one another, or unless a refreshing voltage or current is periodically impressed on them. Isolation by conventional circuitry generally slows response time, or diminishes resolution, or both. Refreshment increases power consumption.

SUMMARY OF THE INVENTION

It is a purpose of the present invention to provide a high resolution, quick response time display screen with isolated display dots.

The present invention isolates each display dot with a separate thin film transistor. It thereby eliminates the excess power needed for refreshing voltages or currents. It maintains good response time and resolution by addressing the transistor (turning it on and off) with thin, low current address leads which run parallel to the face of the display, while powering the display dot (when the transistor is on) between a pair of high current planar electrodes, at least one of which is transparent, and which also are placed parallel to the face of the display. The face of the display, and thus, the plane of the electrodes, may be flat or curved, as may be required by the particular application of the present invention. A planar electrode may be a plate, film, screen, or any other conductive planar structure. The power driving the display dots therefore runs from one planar electrode, perpendicular to the face of the display, to the other planar electrode. While it is in each planar electrode, the power runs parallel to the face of the display. However, the resistance of a planar electrode may be made quite small. Since power does not have to flow through high-resistance thin leads parallel to the face of the display, the RC time constant (which governs the response time of the display) may be made short enough as to give apparently (to human eyes) instantaneous change while maintaining excellent resolution.

In a broad view of the present invention, a planar matrix of electrochromic display dot drive picture elements is provided. Each picture element comprises a drive transistor, a capacitor, and a planar counter electrode. The drive transistor is connected between a planar drive electrode common to all picture elements and the display dot, and includes a control terminal. The capacitor is connected between the drive electrode and the control terminal. The control terminal is connected for turning on in response to the application of a turn-on voltage and for turning off in response to the application of a turn-off voltage. The counter electrode is common to all picture elements, and is connected to the drive electrode through an electric power source.

Means are provided for selectively connecting the control terminal and capacitor to, or insulating them from, a turn-on/turn-off voltage source.

The display dot and the counter electrode are so situated and constructed that, when the drive transistor is turned on, it impresses the display dot with electricity from the electric power source sufficient to change the color of the display dot. The display dots are situated to be simultaneously viewed by an observer off the plane of the matrix.

Conveniently, an isolation transistor is connected in series with the drive transistor and the display dot. It is connected for being turned on, and off, simultaneously with the isolation transistors of all other picture elements.

Conveniently, the drive transistor comprises a first terminal connected to a first node, a gate (the aforementioned control terminal) connected to a second node (the drive transistor turning on in response to the application of a turn-on voltage to the gate, and turning off in response to the application of a turn-off voltage to the gate), and a second terminal connected to the display dot. Likewise conveniently, the capacitor comprises a first terminal connected to the first node and a second terminal connected to the second node. The counter electrode conveniently is connected to the first node through an electric power source, and the second node is conveniently selectively connected to, or insulated from, a turn-on/turn-off voltage source.

It is convenient for the means for selectively connecting the second node to, or insulating the second node from, a turn-on/turn-off voltage source to comprise a voltage operated control transistor. It is also convenient for the drive transistors and the control transistors to be thin film transistors, although any transistor type might be used.

An electrolyte may conveniently be situated between the display dots and the counter electrode.

The present invention may also be viewed as a method for operating a planar matrix of display picture elements. The picture elements are powered between a planar drive electrode and a planar counter electrode, the resulting power flow being perpendicular to the plane of the matrix. At the same time, the picture elements are addressed with leads parallel to the plane of the matrix.

PREFERRED EMBODIMENT FOR CARRYING OUT THE INVENTION

Figure 1:
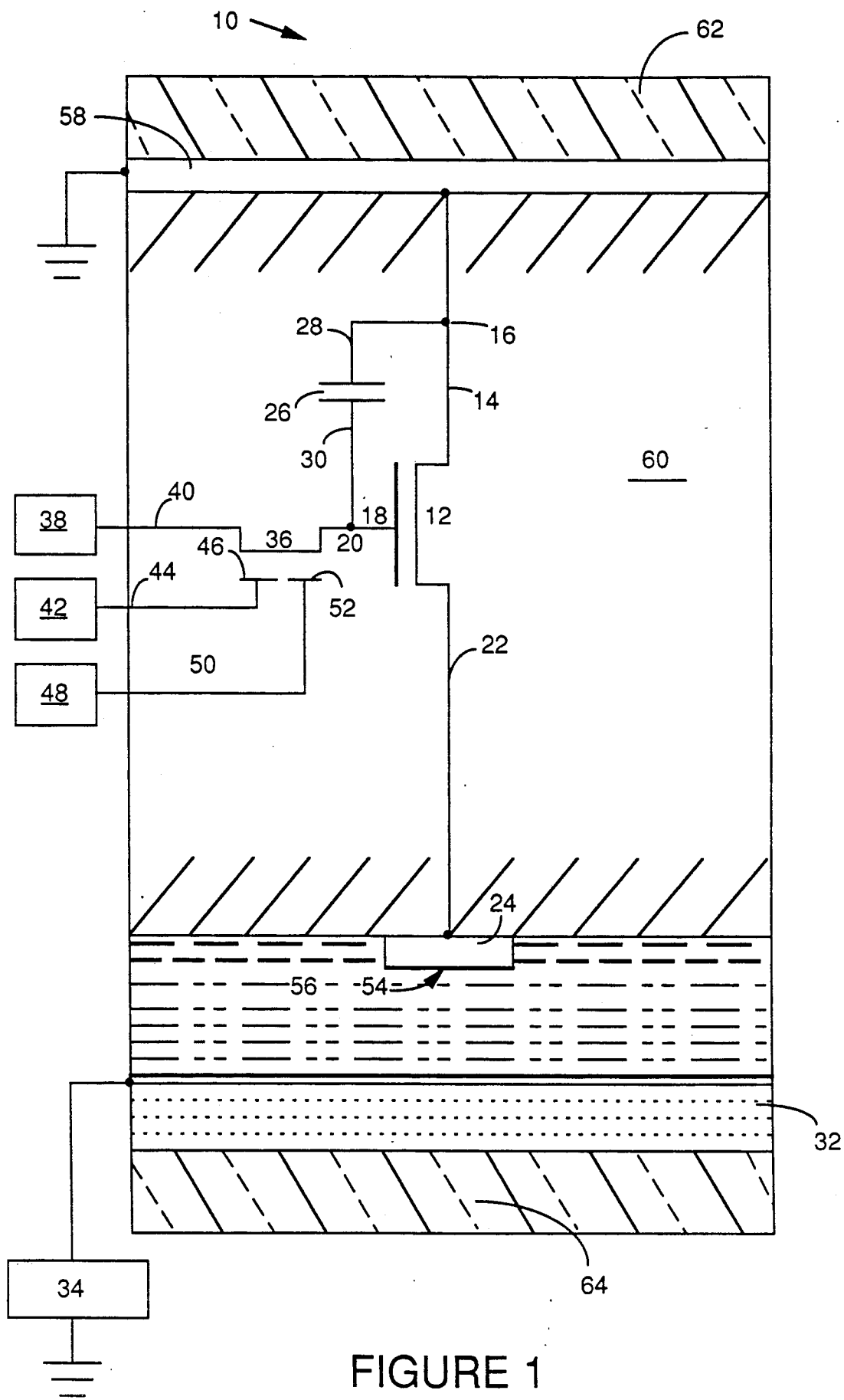
FIG. 1 shows a schematic cross section of the portion of the display surrounding a display dot, together with the electronics which address that dot.

Turning now to FIG. 1, electrochromic display dot drive picture element 10 comprises a voltage operated thin film drive transistor 12 comprising a first terminal 14 connected to a first node 16, a gate 18 connected to a second node 20, and a second terminal 22 connected to a conductor dot 24. The first node 16 may be considered a power node, and the second node 20 may be considered a control node. The picture element further comprises a capacitor 26 comprising a first terminal 28 connected to the first node 16, and a second terminal 30 connected to the second node 20. The picture element further comprises a portion of a planar counter electrode 32 connected to the first node 16 through a grounded electric power source 34. The ground is convenient, but is not absolutely necessary for the proper operation of the present invention. The counter electrode 32 is common to all drive picture elements 10. The plane of the counter electrode 32 is parallel to the plane of the matrix 66 of drive picture elements 10 (see FIG. 2). The drive picture element 10 further comprises a thin control transistor 36, or similar means for selectively connecting the second node 20 to, or insulating the second node 20 from, an external turn-on/turn-off voltage source 38. This control transistor 36 typically is also voltage operated.

A low current drive lead 40 extends parallel to the plane of the matrix 66 from the turn-on/turn-off voltage source 38 to the control transistor 36, to impress either a turn-on voltage on gate 18 sufficient to turn the drive transistor 12 on, or a turn-off voltage on gate 18 sufficient to turn the drive transistor 12 off. The control transistor 36 is itself controlled by an external row control apparatus 42 via a low current row control lead 44 from the row control apparatus 42 to the row gate 46 of the control transistor 36. It is also controlled by an external column control apparatus 48 via a low current column control lead 50 from the column control apparatus 48 to the column gate 52 of the control transistor 36. While a double gated control transistor 36 is most convenient and is shown, a pair of transistors in series (a row control transistor and a column control transistor) could also be used. Any apparatus is satisfactory if it closes the lead 40 from the turn-on/turn-off voltage source 38 to the second node 20 when, and only when, both the row control apparatus 42 and the column control apparatus 48 send control-on signals to the control transistor 36, or to the replacement for the control transistor 36.

Figure 2:
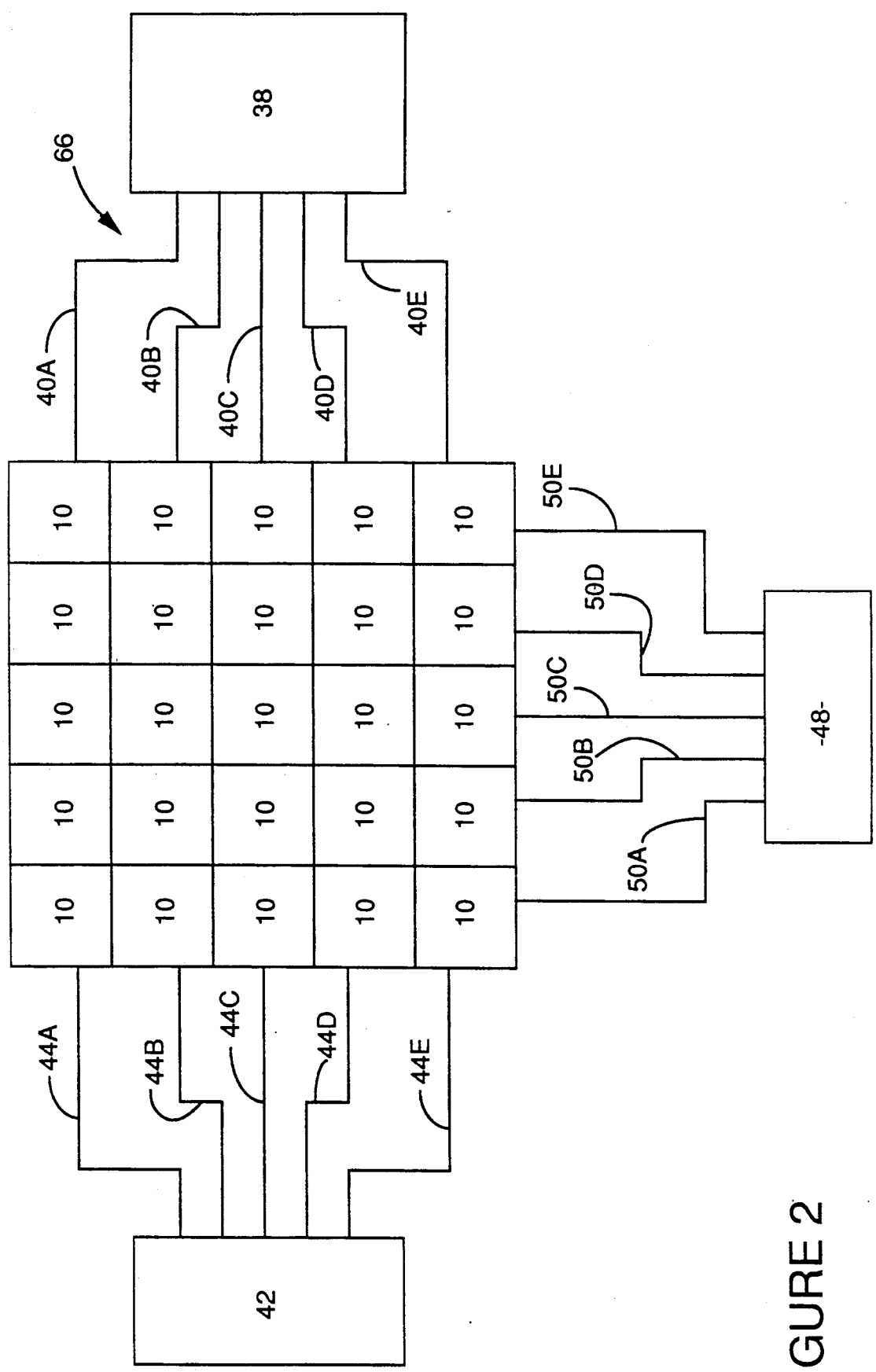
FIG. 2 shows a schematic frontal view of a plurality of display picture elements and their address leads.

An electrochromic display dot 54 is connected to the conductor dot 24, and is in contact with an electrolyte 56, which also contacts the counter electrode 32. The first node 16 is connected to a portion of a grounded planar drive electrode 58. The ground is convenient, but is not absolutely necessary for the proper operation of the present invention. The drive electrode 58, like the counter electrode 32, is common to all drive picture elements 10, and its plane, like the plane of the counter electrode 32, is parallel to that of the matrix 66 (FIG. 2). Power flows from the drive electrode 58 to the counter electrode 32, perpendicular to the plane of the matrix 66. The drive transistor 12, capacitor 26, and control transistor 36 are encased between the electrolyte 56 and drive electrode 58 in an insulating substrate 60. The entire heretofore recited apparatus is encased between a first supporting substrate 62 and a second supporting substrate 64.

Similar picture elements adjoining the picture element 10 share the electrodes 32 and 58, electrolyte 56, and substrates 60, 62, and 64 with the picture element 10.

The operation of the present invention is readily understood. The control apparatuses 42 and 48 determine whether or not the display picture element 10 should be activated. If it should, then both control apparatuses 42 and 48 send a control-on signal along low current leads 44 and 50 to the gates of the control transistor 36, thereby allowing the turn-on voltage from the turn-on/turn-off voltage source 38 to pass through lead 40 and control transistor 36 to the second node 20. The drive lead 40 and row control lead 44 run parallel to each other, and serve the same row. At second node 20, the turn-on voltage charges the capacitor 26 and turns on the gate 18 of the drive transistor 12. The capacitor 26 locks the drive transistor 12 into the on state.

At this point, electricity from the electric power source 34 begins to pass through the drive electrode 58, first node 16, drive transistor first terminal 14, drive transistor 12, drive transistor second terminal 22, and conductor dot 24 to reach the display dot 54. The electricity may be in the form of voltage or current, depending on the nature of the display dot 54.

When the electricity reaches the display dot 54, it may change the color of the display dot 54 using any of a number of mechanisms. The exact mechanism of color change is immaterial to, and forms no part of, the present invention, which is confined to matrices of such picture elements for driving such electrochromic display dots.

The foregoing description details how one display dot 54 may be addressed to be on. A second display dot 54, also on control lead 44, may be addressed to be off even if it is adjacent to the first display dot 54. First, a control-off signal is set on control lead 44. This isolates the drive transistors 12 driving both display dots 54 from the turn-on/turn-off voltage source 38. While both drive transistors 12 are thus isolated, the turn-on/turn-off voltage source 38 may be set to turn-off, and the second drive transistor 12 (which previously was turned on and now needs to be turned off) is selected by sending a control-on signal on the corresponding column control lead 50 from column control apparatus 48. A control-on signal is then sent on the row control lead 44. This allows the turn-off voltage from the source 38 to turn off the second selected drive transistor 12, thereby deactivating the element of which it is a part. At second node 20, the turn-off voltage will discharge the capacitor 26 and will turn off the gate of the drive transistor 12. The capacitor 26 locks the drive transistor 12 off, and prevents further color change.

The foregoing description has been in terms of first turning on a drive transistor 12 which previously had been off, and then turning off a second drive transistor 12 which previously had been on. It is apparent that any number of drive transistors 12 may be turned on simultaneously if each of a like number of column control leads 50 has a control-on signal set on it simultaneously by column control apparatus 48 at the correct moment. It is also apparent that any number of second drive transistors 12 may be turned off simultaneously by causing the column control apparatus 48 to simultaneously apply a control-on signal at another correct moment (later than the first) to a second set of column control leads 50.

A multiplicity of the foregoing electrochromic display dot drive picture elements 10 may be formed into a planar rectangular matrix 66, as is best seen in FIG. 2. The matrix 66 is shown, for simplicity, as a 5×5 matrix, although, in practice, the number of rows and columns would be much larger.

The turn-on/turn-off voltage source 38 is configured to send a turn-off voltage through all but one of the drive leads 40A through 40E. The exception is drive lead 40A, through which the turn-on/turn-off voltage source instead sends a turn-on voltage. The turn-on voltage is maintained on the drive lead 40A for the minimum period of time needed to turn on selected drive transistors 12 in the first row, as is described in greater detail below. Other drive transistors 12 are then selected and addressed for being turned off, also as described in greater detail below. The source 38 then sends a turn-off voltage through row lead 40A. This turns off the other selected picture elements in the first row.

The turn-off voltage through row lead 40A is followed by a turn-on voltage through drive lead 40B. The source 38 maintains this turn-on voltage on drive lead 40B for a like period of time, then sends a turn-off voltage through drive lead 40B and then a turn-on voltage through drive lead 40C. This continues to the bottom row. For each row, the column control apparatus 48 may send control signals through any, all, or none of the column leads 50A through 50E, depending on which picture elements 10 in that row need to be turned on and thereby eventually have the color of their display dots 54 changed, or need to be turned off and thereby protect their display dots 54 from eventual color change.

Typically, the matrix 66 has some of its display dot drive picture elements 10 in a drive transistor off configuration, and some in the on configuration; that is, an electric pulse from the electric power source 34 will change the colors of some, but not all, of the display dots 54. The column control apparatus 48 determines which of the display dot drive picture elements 10 in the first row (the one served by row lead 44A) should have their colors changed, e.g., the second and the fifth elements. Suppose the second element is already on. Then only the fifth element needs to be turned on. The apparatus 48 then sends a control-on signal along the appropriate column lead or leads, e.g., column lead 50E. The row control apparatus 42 sends a control-on signal on row lead 44A. This turns on the corresponding control transistor 36 of the first row (the fifth control transistor in the present example), which in turn connects the turn-on/turn-off voltage source 38 to the second node 20 of the same (e.g. fifth) picture element 10 of the first row of the matrix 66.

In some applications, the column control apparatus 48 may be simplified if it can send a control-on signal to the elements 10 which should be on, regardless of whether they are already on (e.g., second element), or need to be turned on (e.g., fifth element). This is especially true when the control transistor 36 is voltage operated rather than current operated.

At this point, the turn-on/turn-off voltage source 38 sends a turn-on voltage signal through drive lead 40A. This turns on the appropriate (e.g. fifth) drive transistor 12 on the first row. It also charges the corresponding (e.g. fifth) capacitor 26 on the first row. Electricity from the electric power source 34 therefore begins to pass through this selected drive transistor 12, and through the associated display dot 54, and thus begins to change the color of this selected display dot 54.

The row control apparatus 42 then sends a control-off signal through row lead 44A, which turns off all of the control transistors 36 of the first row, including the previously selected (e.g. fifth) control transistors 36. This isolates all of the drive transistors 12 of the first row, including the corresponding (e.g. fifth) drive transistor 12.

The column control apparatus 48 then sends a control-on signal through the appropriate column leads 50 according to which of the display dots 54 in the first row should have their color turned off. Suppose, for example, that the third and fourth display dots 54 in the first row are to be turned off and that the fourth element is already off. Thus only the third element needs to be turned off. This would be accomplished by changing the signal on column lead 50C from control-off to control-on, changing the signal on column lead 50D from control-on to control-off, and maintaining the control-off signal on column leads 50A, 50B, and 50E.

The row control apparatus 42 then sends a control-on signal on row lead 44A, and the turn-on/turn-off voltage source 38 then sends a turn-off voltage signal through drive lead 40A, which turns off the appropriate (e.g. third) drive transistor 12, and prevents electricity from electric power source 34 from passing through these drive transistors 12 between drive electrode 50 and counter electrode 32. This prevents any change of the color of the corresponding (e.g. third) display dot 54.

If the column control apparatus 48 has been simplified, as described above, so as to have previously sent a control-on signal to the elements 10 which needed to be on (regardless of whether they previously were on), then, at this later time, the column control apparatus 48 should send a control-on signal to all the other elements 10, which now need to be off (regardless of whether they previously were off).

This process of addressing picture elements 10 row by row continues until the bottom row is reached. There is no faradic discharge between capacitors 26, since the respective control transistor 36 is off except when the respective drive transistor 12 is being opened or closed. There is likewise no galvanic discharge between display dots 54, since the drive transistors 12 are on only when the color of the respective dots 54 are being changed.

When the bottom row is reached, all of the addressed display dots 54 in all of the rows have begun to obtain a common color, determined by the electricity on the drive source 34, unless, of course, an isolation transistor 68 is present. After the turn-on/turn-off voltage source 38 has finished addressing the bottom row, that row's drive transistors 12, like the drive transistors 12 of all other rows, are in a locked configuration, locked on or off by the capacitors 26. Appropriate (on) display dots throughout the entire matrix 66 may therefore change color in response to the electric power source 34. The time needed to complete this color change will depend on the amount of power applied, the degree of color change desired, the construction of the display dot 54, and the like. It will generally be longer than the time needed to address the matrix 66. Then, the electric power source 34 is changed to a new voltage, current, or whatever is appropriate to drive newly selected display dots 54 to a new color, and then, beginning at the first row, the process is repeated. This addressing process is very fast, faster than the time needed to change the color of the display dots 54.

The foregoing description of the operation of the present invention has depicted a reduced power mode of operation. Electricity is sent along leads 40A through 40E one lead at a time. However, the complexity of the turn-on/turn-off voltage source 38 may be reduced if it sends identical voltage signals simultaneously on all leads 40A through 40E. This will have no effect on the operation of the elements 10 on any row other than row currently being addressed by the row control apparatus 42, since the control transistors 36 on these non-addressed rows will have been turned off by the application of a control-off voltage to the row gate 46. This isolates the drive transistors 12 and capacitors 26 from whatever voltage the turn-on/turn-off voltage source 38 may be producing.

If the presence of electricity on the leads 40 of the non-addressed rows causes undesired side effects, one-lead-at-a-time operation should be maintained. If such side effects are minimal or non-existent, multiple-lead operation allows greater simplicity. In this situation, the leads 40 may be replaced with a planar electrode 40, similar to the electrodes 32 and 58.

The foregoing discussion contemplates setting each picture element 10 either on or off on a line-by-line basis. It is apparent that all of the appropriate picture elements 10 in the entire matrix 66 may be set on, followed by a setting off of all of the other picture elements in the entire matrix 66, followed by the color change. This option is generally more attractive when the time needed to address the entire matrix 66 is much smaller than the time needed to change the color of a display dot 54.

The electric power source 34 may therefore change the power applied to the counterelectrode 32 while addressing is taking place. If the time needed to address the matrix 66 is much less than the time needed to change the color of a display dot 54, then all of the addressed display dots 54 throughout the entire matrix will appear to change color simultaneously. The slowness of line-by-line color change is therefore replaced by the speed of line-by-line addressing, and matrix-as-a-whole color change.

Figure 3:
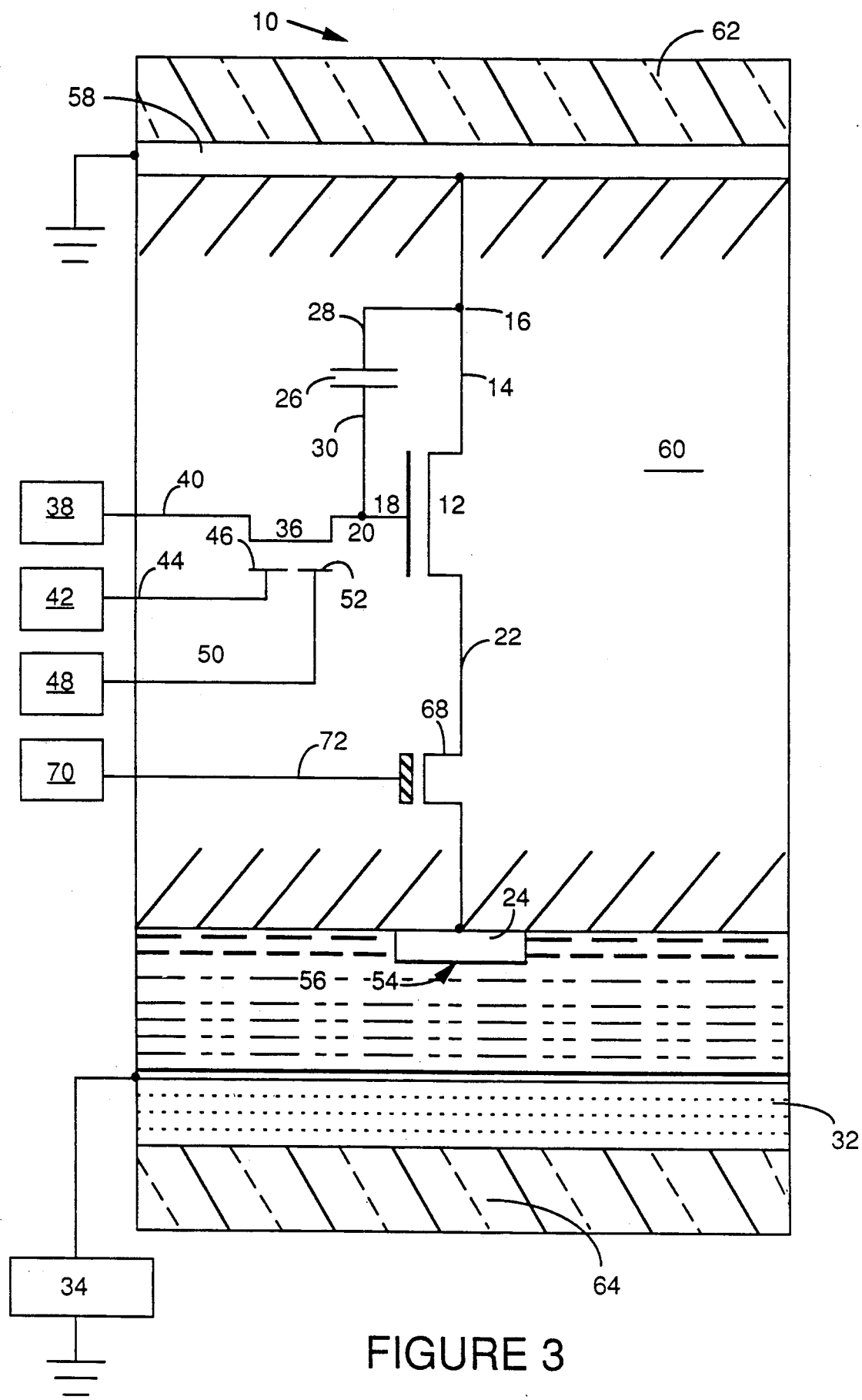
FIG. 3 is similar to FIG. 1, and further shows an isolation transistor and associated apparatus.

If the time needed to address the matrix 66 is comparable to the time needed to change colors, some color change will take place during the addressing process. Turning now to FIG. 3, apparatus is shown which deals with the situation when the time needed to address the matrix 66 is comparable to the time needed to change colors. In this situation, some color change will take place during the addressing process. This distracting effect may be eliminated by placing an isolation transistor 68 in series with the drive transistor 12. The isolation transistor 68 is so called because it isolates the drive transistor 12 from the display dot 54, and therefore holds in check the color change which otherwise would begin to take place as soon as the drive transistor 12 is turned on. An isolation apparatus 70 sends a turn-off voltage to the isolation transistor 68, over the isolation lead 72, while addressing is taking place. Isolation lead 72, like lead 40, may be replaced with a planar electrode. This turn-off voltage is applied simultaneously to every isolation transistor 68 in the entire matrix 66.

When addressing has been completed, the isolation apparatus 70 simultaneously applies a turn-on voltage to every isolation transistor 68 in the entire matrix 66. The color change therefore takes place simultaneously over the entire matrix. When the color change is complete, the isolation transistors 68 are all turned off again simultaneously, and the next addressing cycle takes place.

In some applications, such as thin screen video, simultaneous color change may be less important than rapid color change. In this case, the time used to address the matrix can also be used as part or all of the time needed to change the color of the matrix. The isolation transistors 68 may then be omitted. Alternatively, the isolation apparatus 70 may simply turn all of the isolation transistors 68 on, and leave them on.

Leads 44, 50, and 72, like lead 40, run parallel to the plane of matrix 66. Low current logic thus flows along leads 40, 44, 50, and 72, parallel to the plane of matrix 66, while high current color-changing power (high current, that is, with respect to the current of the logic) flows perpendicular to the plane of the matrix 66, between drive electrode 58 and counter electrode 32.

Frame-to-frame addressing time of the matrix 66 is independent of the resolution, that is, the number N of rows and columns per inch. The time it takes to address an entire inch-square N by N matrix 66 is generally much shorter than the time it takes to change the color of a display dot 54. The time it takes to change the color of a display dot 54 depends on the particular electrochromic or chemochromic mechanism selected, and not on the size of the display dot 54; that is, it does not depend on N. It takes four times as long to address a matrix 66 which has the same resolution but four times the area (twice the length and twice the width). However, even this time is substantially less than the time needed to change the color of a display dot 54.

The time needed to address the matrix 66 has two components. The first component is the time needed to send a signal to each picture element 10 along the logic leads 40, 44, 50, and 72. The second component is the time needed for the transistors 12 and 36, and capacitor 26, to react to these signals. These components will be examined separately.

Each electrochromic display dot drive picture element 10 has transistors which act, to the first approximation, as a resistance and a capacitance in series. The capacitance of each picture element's transistors is proportional to its cross sectional area, that is, $1/N^2$. Increasing the number of picture elements increases the number of logic leads 40, 44, 50 and 72. This has no effect on the average length or thickness of the logic leads 40, 44, 50, and 72, but does make them narrower in width, thereby making the resistance to each picture element proportional to N. The resistance of each picture element 10 is small in comparison to the resistance of the leads which serve it. The RC time constant, which is the limiting factor in switching speed, is therefore proportional to $(1/N^2)(N) = 1/N$; it actually drops with increasing resolution. It is this figure which determines how long the turn-on or turn-off (or control-on or control-off) voltage must be maintained on any of the logic leads 40, 44, 50, and 72. Since there are N lines, the addressing time for the entire matrix 66 is proportional to $(1/N)(N)$; that is, increased resolution has no effect on addressing time.

The preceding discussion of RC time constants has been directed to the leads which carry the logic currents to the pixels 10, and has shown that increased resolution need not be purchased at the cost of slower addressing time. A similarly encouraging result comes from an examination of the time required to power a change in the color of pixels 10 themselves. The cross section of the conductors between electrodes 32 and 58 which carry current to the display dots 54, and of the display dots 54 themselves, decreases by $1/N^2$. This increases R by a factor of $N^2$, and decreases C by the same $N^2$ factor. The RC time constant for color change of the pixel itself is therefore also unaffected by an increase in resolution. (The electrodes 32 and 58, not being leads, make no significant contribution to R.)

The use of logic leads instead of power leads overcomes an important limitation in the prior art. It is readily seen in both the prior art and in the present invention, that, as N increases, the number of picture elements 10 served by a lead running parallel to the matrix 66 increases by a factor of N. The number of electrons needed to change a picture element is proportional to the cross sectional area of the picture element, $1/N^2$. The number of electrons needed to change an entire row (or column) of picture elements 10 is therefore proportional to $1/N$. However, the RC time constant for serving that row or column has also dropped by a factor of $1/N$. The reduction in the number of electrons needed to be carried on a lead is therefore exactly matched by the time available to carry them. The current on each lead is therefore independent of N.

Herein lies an important limitation in the prior art. The same amount of current must be carried on progressively thinner leads, which therefore have progressively reduced current carrying capacity. It is an important feature of the present invention that this prior art limitation is largely circumvented. The currents carried on the logic leads of the present invention are very small, i.e., just sufficient to turn on and off the transistors 12, 36, and 68. No attempt is made to use power leads to deliver the high currents needed to change the display dots 54. The high current needed to power the display dots 54 sets an upper bound on N, determined by the current carrying capability of the power leads of the prior art. When it is desired to increase resolution by increasing N, the reduced thickness of the prior art power leads forces the switching time to be lengthened. When it is desired to improve switching time, the prior art power leads must be made wider, with a corresponding decrease in resolution. This frustrating trade-off exists in the prior art despite advances in the ability to make the power leads narrower, and the picture elements 10 smaller and quicker. This trade-off is largely circumvented in the present invention by the use of logic leads only, the power leads of the prior art being replaced by plate electrodes.

The transistors 12, 36, and 68 must have an adequately high gain. In addition, one of the plates 32 or 58 must be made transparent; both must be transparent if the display is to be back lighted. These technical problems are more readily solved than the structural limitation of power leads of limited current carrying capability.

In some applications, such text display, only two colors are needed, such as black and white. In such applications, it only takes two top to bottom passes to change the entire frame: one pass to change some or all of the previously black display dots to white, and a second pass to change some or all of the previously white dots to black.

Other applications, however, such as thin screen television, require dozens of different shades of gray, or hundreds of different colors. If each of this multiplicity of shades or colors were separately impressed on the screen in a separate top to bottom pass, frame-to-frame switching time could increase with this multiplicity, and might become unacceptably long. In this situation, a finely resolved mixture of a few basic colors (e.g., red, green, blue, black, and white) could be used to produce the appearance of a multiplicity of colors or shades of gray, as is currently practiced in the television industry. There is a correspondingly coarser resolution. However, resolution is often easier to obtain than color gradation, as has been shown above.

In still other applications, gradations in color closely follow gradations in voltage, and the time required to make small color changes is also small. In such applications, resolution can be increased by finely coloring individual pixels, without being limited to basic colors, and without too severe a lengthening in response time. The skilled artisan can select the correct balance between color selection, resolution, and response time.

INDUSTRIAL APPLICABILITY

The present invention may be exploited in any situation in which it is desired to display data on a thin screen, with good resolution and response time. It may be made by thin film transistors and display dots, and may be used to display information of any character.

The present invention is suitable for field sequential television, in which all of the pixels to be set to a particular color are set to that color before any of the pixels to be set to a different color are set to that different color. The additional capability for line-at-a-time coloring is retained, should it be desired.

While a preferred embodiment for carrying out the present invention has been described, the invention is not limited thereto, but has a scope and spirit as set out in the following claims.

What is claimed is:

1. A planar matrix of electrochromic display dot drive picture elements, wherein:
   a) each picture element comprises:
      1) a drive transistor
         i) connected between a planar drive electrode, common to all picture elements, and the display dot and
         ii) connected for turning on in response to the application of a turn-on voltage to a control terminal, and for turning off in response to the application of a turn-off voltage to the control terminal;
      2) a capacitor connected between the drive electrode and the control terminal;
      3) a planar counter electrode common to all picture elements, connected to the drive electrode through an electric power source; and
      4) means for selectively connecting the control terminal and capacitor to, or insulating them from, a turn-on/turn-off voltage source;
   b) the display dot and the counter electrode are so situated and constructed that, when the drive transistor is turned on, it impresses the display dot with electricity from the electric power source sufficient to change the color of the display dot; and
   c) the display dots are situated to be simultaneously viewed by an observer off the plane of the matrix.

2. The matrix of claim 1, wherein each picture element further comprises an isolation transistor which is connected in series with the drive transistor and the display dot, and which is connected for being turned on simultaneously with the isolation transistors of all other picture elements, and for being turned off simultaneously with the isolation transistors of all other picture elements.

3. The matrix of claim 1, wherein:
   a) the drive transistor comprises:
      1) a first terminal connected to a first node;
      2) a gate connected to a second node, the drive transistor turning on in response to the application of a turn-on voltage to the gate, and turning off in response to the application of a turn-off voltage to the gate; and
      3) a second terminal connected to the display dot;
   b) the capacitor comprises:
      1) a first terminal connected to the first node; and
      2) a second terminal connected to the second node;
   c) the counter electrode is connected to the first node through an electric power source; and
   d) the second node is selectively connected to, or insulated from, a turn-on/turn-off voltage source.

4. The matrix of claim 3, wherein each picture element further comprises an isolation transistor which is connected in series with the drive transistor and the display dot, and which is connected for being turned on simultaneously with the isolation transistors of all other picture elements, and for being turned off simultaneously with the isolation transistors of all other picture elements.

5. The matrix of claim 3 wherein a means for selectively connecting the second node to, or insulating the second node from, a turn-on/turn-off voltage source comprises a voltage operated control transistor.

6. The matrix of claim 5, wherein each picture element further comprises a voltage operated isolation transistor which is connected in series with the drive transistor and the display dot, and which is connected for being turned on simultaneously with the isolation transistors of all other picture elements, and for being turned off simultaneously with the isolation transistors of all other picture elements.

7. The matrix of claim 5 wherein the drive transistors and the control transistors are thin film transistors.

8. The matrix of claim 7, wherein each picture element further comprises a thin film isolation transistor which is connected in series with the drive transistor and the display dot, and which is connected for being turned on simultaneously with the isolation transistors of all other picture elements, and for being turned off simultaneously with the isolation transistors of all other picture elements.

9. The matrix of claim 3 further comprising an electrolyte between the display dots and the counter electrode.

10. The matrix of claim 9, wherein each picture element further comprises an isolation transistor which is connected in series with the drive transistor and the display dot, and which is connected for being turned on simultaneously with the isolation transistors of all other picture elements, and for being turned off simultaneously with the isolation transistors of all other picture elements.

* * * * *